United States Patent [19]

Yoshioka

[11] Patent Number: 4,827,361
[45] Date of Patent: May 2, 1989

[54] HEAD CLOGGING DETECTOR FOR USE IN A VIDEO TAPE RECORDER

[75] Inventor: Hiroshi Yoshioka, Kanagawa, Japan
[73] Assignee: Sony Corporation, Tokyo, Japan
[21] Appl. No.: 96,508
[22] Filed: Sep. 15, 1987
[30] Foreign Application Priority Data Sep. 18, 1986 [JP] Japan .................. 61-220291

[51] Int. Cl.⁴ .............................. G11B 15/14
[52] U.S. Cl. ........................ 360/64; 360/31; 360/55; 360/77.14
[58] Field of Search ............ 360/70, 134, 73, 77, 360/64, 31, 38.1, 55; 369/53

[56] References Cited

U.S. PATENT DOCUMENTS

| | | | |
|---|---|---|---|
| 3,525,930 | 8/1970 | Hodge | 360/31 X |
| 4,489,354 | 12/1984 | Dann | 360/31 X |
| 4,594,615 | 6/1986 | Nemoto et al. | 360/77 X |
| 4,607,297 | 8/1986 | Sonoda et al. | 360/64 X |
| 4,618,899 | 10/1986 | Doutsubo | 360/73 |
| 4,642,704 | 2/1987 | Doutsubo | 360/77 X |
| 4,658,309 | 4/1987 | Yasuda et al. | 360/77 |
| 4,660,103 | 4/1987 | Wilkinson et al. | 360/19.1 X |
| 4,682,247 | 7/1987 | Doutsbo | 360/73 X |
| 4,736,260 | 4/1988 | Wilkinson | 360/19.1 |

*Primary Examiner*—Eugene R. LaRoche
*Assistant Examiner*—Seung Ham
*Attorney, Agent, or Firm*—Lewis H. Eslinger; Donald S. Dowden

[57] ABSTRACT

In recording/reproducing apparatus, pilot signals of different frequencies are recorded cyclically and in a predetermined sequence on parallel record tracks on a moving record medium together with an information signal organized in a series of fields and are employed to control tracking of a reproducing head of the apparatus during reproduction. During reproduction, the record medium is transported at a predetermined speed and phase relative to the reproducing head in order to generate reproduced pilot signals and a reproduced information signal. The reproduced pilot signals are multiplied by reference pilot signals switched in accordance with a head switching signal, thereby generating an output from which a tracking error signal is derived. The tracking error signal is sampled and held at predetermined points of a plurality of fields. A comparator effects a comparison of the sampled-and-held signal with a reference signal and produces a comparator output signal having a state that depends on the comparison. A head clogging detector is responsive to the comparator output signal for effecting detection of a head-gap clogged condition of the reproducing head.

6 Claims, 5 Drawing Sheets

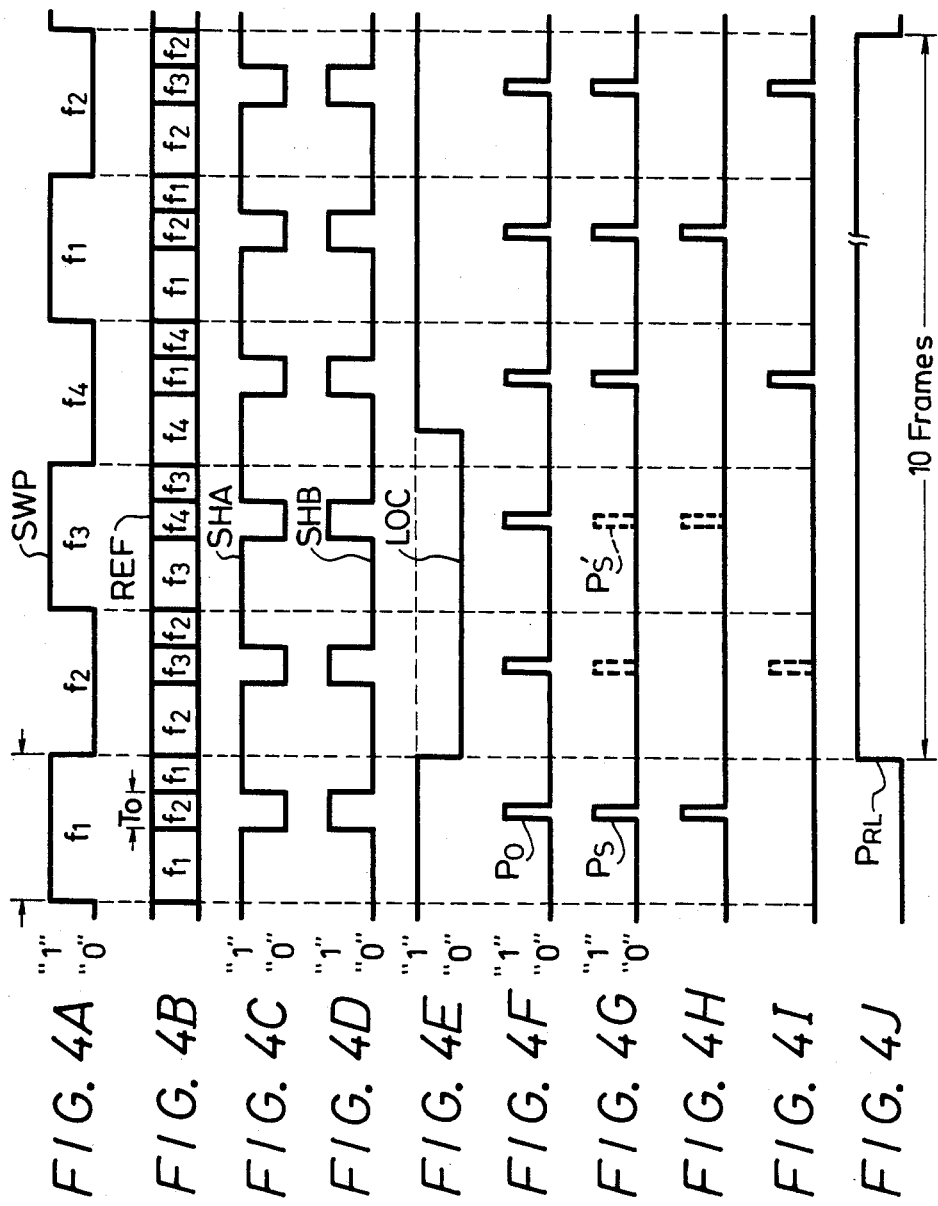

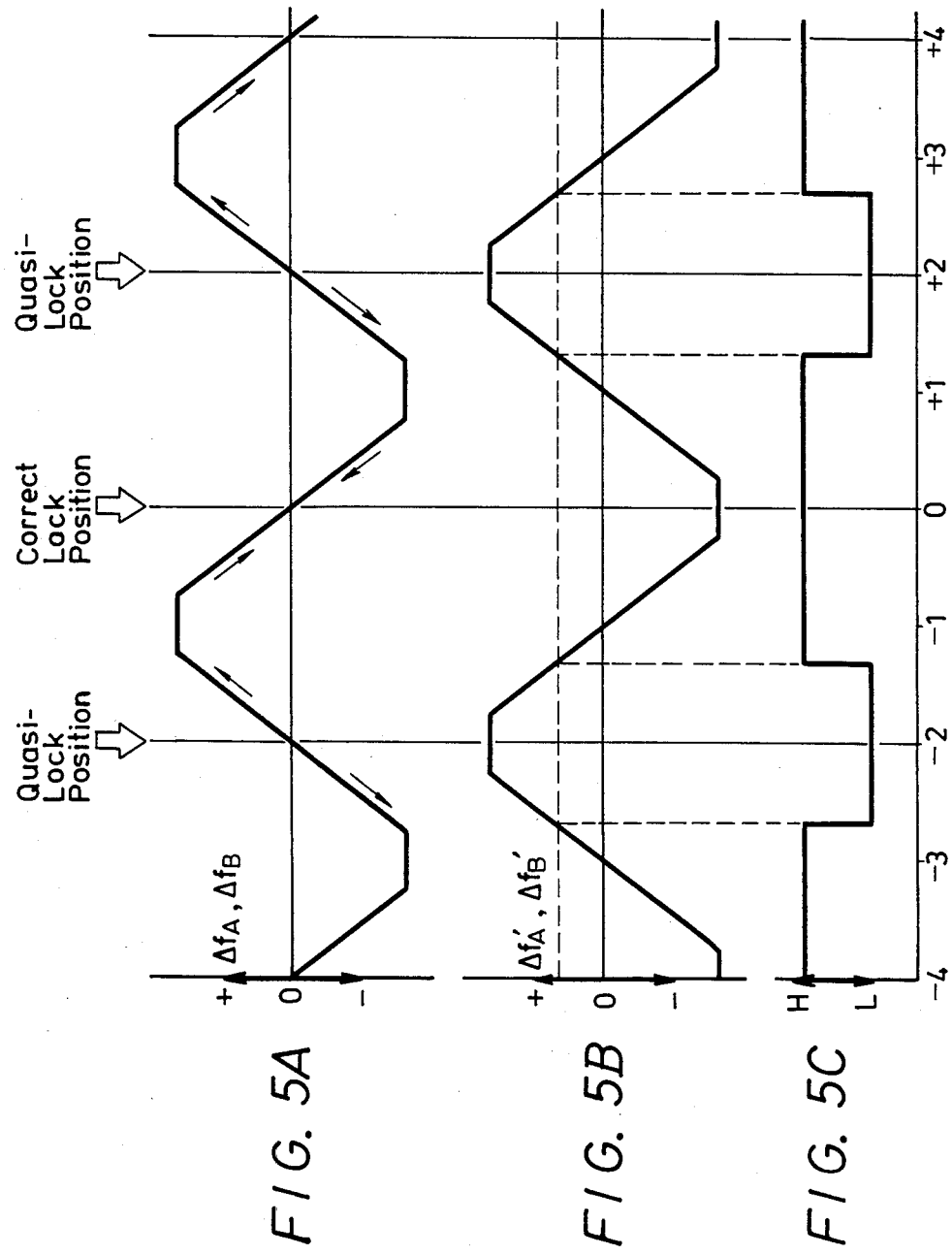

HEAD CLOGGING DETECTOR FOR USE IN A VIDEO TAPE RECORDER

BACKGROUND OF THE INVENTION

1. Field of the Invention

This invention relates to recording/reproducing apparatus and, more particularly, to novel and highly-effective recording/reproducing apparatus that employs magnetic heads and can detect clogging therof.

2. Description of the Prior Art

Clogging of the magnetic heads of a video tape recorder (VTR) badly affects the recording and reproducing operations of the VTR. This clogging of magnetic heads is caused by the deposition thereon, especially in the gaps thereof, of magnetic material coated on the base of the magnetic tape medium. Clogging of the heads is especially troublesome during recording.

To remedy this problem, the clogged state has been conventionally detected by a circuit such as the one shown in FIG. 1.

In FIG. 1, a rotary drum 41 is provided to which a pair of magnetic heads $H_A$ and $H_B$ having azimuth angles (a slant angle of the magnetic gap relative to the scanning direction) different from each other are attached with an angular distance of 180° therebetween. A magnetic tape 42 is wrapped around the peripheral surface of the rotary drum 41 with a tape wrap angle of substantially 180° and transported in the longitudinal direction of the tape. The rotary magnetic heads $H_A$ and $H_B$ are rotated through an angle of 360° while the magnetic tape 42 is transported through a distance of one frame; that is, the magnetic heads $H_A$ and $H_B$ are rotated one revolution per one frame. The magnetic head $H_A$ scans the magnetic tape 42 in odd-numbered fields and the magnetic head $H_B$ scans the magnetic tape 42 in even-numbered fields.

Video signals reproduced by the magnetic heads $H_A$ and $H_B$ in a given reproducing period, for example during edit recording, are supplied through signal amplifiers 43A and 43B to terminals or contacts A and B of a head changeover switch 44. The head changeover switch 44 is further supplied with a so-called RF switching pulse SWP which is synchronized with the rotating phase of the magnetic heads $H_A$ and $H_B$ as a changeover control signal. A movable contact C of the head changeover switch 44 is connected to the terminal A in one field period during which the magnetic head $H_A$ scans the magnetic tape 42 and to the terminal B in one field period during which the magnetic head $H_B$ scans the magnetic tape 42.

Reproduced signals successively supplied as outputs from the changeover switch 44 are supplied to a peak detecting circuit 45, the detected output of which is supplied to a comparator 46 wherein it is compared with a reference voltage $V_{REF}$. The output signal from the comparator 46 indicative of the comparison result assumes a high level or "1" when the detection ouput from the peak detecting circuit 45 represents a normal reproduced video signal. On the other hand, when clogging occurs in the magnetic heads $H_A$ and $H_B$, signals are picked up barely or not at all from the recorded track on the magnetic tape 42, so that the detection output assumes a low level or "0" and consequently the output signal from the comparator 46 assumes the low level or "0".

The output signal from the comparator 46 is supplied to a display device 47 which indicates whether or not clogging has occurred.

The clogged state detecting circuit described above is disclosed, for example, in laid-open Japanese utility model publication No. 59-60724.

In the conventional clogged state detecting circuit shown in FIG. 1, the reference voltage $V_{REF}$ supplied to the comparator 46 should of course be set at a level higher than the noise level. If the normal level of the reproduced video signals is assumed to be 0 dB, the noise level is approximately −20 dB. Thus, the level of the reference voltage $V_{REF}$ should be set at about −14 to −15 dB. However, scattering resulting from thermal characteristics and so on makes it extremely difficult to adjust the level of the reference voltage $V_{REF}$ with the required accuracy. If the level of the reference voltage $V_{REF}$ is set at too small a value, then, because of noise, the clogged state cannot be detected. On the other hand, if the level of the reference voltage $V_{REF}$ is set at too large a value, even a small decrease in the level of the reproduced video signals is interpreted to indicate the clogged state. Thus, the clogged state detecting circuit of FIG. 1 is lacking in accuracy and reliability.

OBJECTS AND SUMMARY OF THE INVENTION

In view of the problem mentioned above, it is an object of the present invention to provide a recording/reproducing apparatus that ensures accurate and reliable detection of clogging occurring in the magnetic heads thereof.

In particular, an object of the invention is to provide such apparatus that ensures accurate and reliable detection of clogging despite the effects of thermal noise, etc.

To achieve these and other objects, the present invention provides apparatus wherein pilot signals of different frequencies are recorded cyclically and in a predetermined sequence on parallel record tracks on a moving record medium together with an information signal organized in a series of fields and are employed to control tracking of a reproducing head of the apparatus during reproduction of the pilot signals and information signal; the apparatus comprising: means for transporting the record medium at a predetermined speed and phase relative to the reproducing head in order to generate reproduced pilot signals and a reproduced information signal; means for generating reference pilot signals; means for supplying a head switching signal; and means for effecting a multiplication of the reproduced pilot signals with the reference pilot signals switched in accordance with the head switching signal and for generating a tracking error signal in response to the multiplication, the apparatus being characterized by: sample-and-hold means for sampling and holding the tracking error signal at predetermined points of a plurality of the fields; comparator means for effecting a comparison of the output of the sample-and-hold means with a reference signal and producing a comparator output signal having a state that depends on the comparison; and head clogging detector means responsive to the comparator output signal for effecting detection of a head-gap clogged condition of the reproducing head.

These and other objects, features and advantages of the present invention will become apparent from the following detailed description of the preferred embodiment thereof, taken in conjunction with the accompanying drawings, throughout which like reference characters designate like elements and parts.

BRIEF DESCRIPTION OF THE DRAWINGS

FIGS. 4A to 4J are timing charts employed for explaining operations of the apparatus of FIG. 2;

FIGS. 5A to 5C are graphs showing detection characteristics of the apparatus of FIG. 2.

DESCRIPTION OF THE PREFERRED EMBODIMENT

Figure 2:
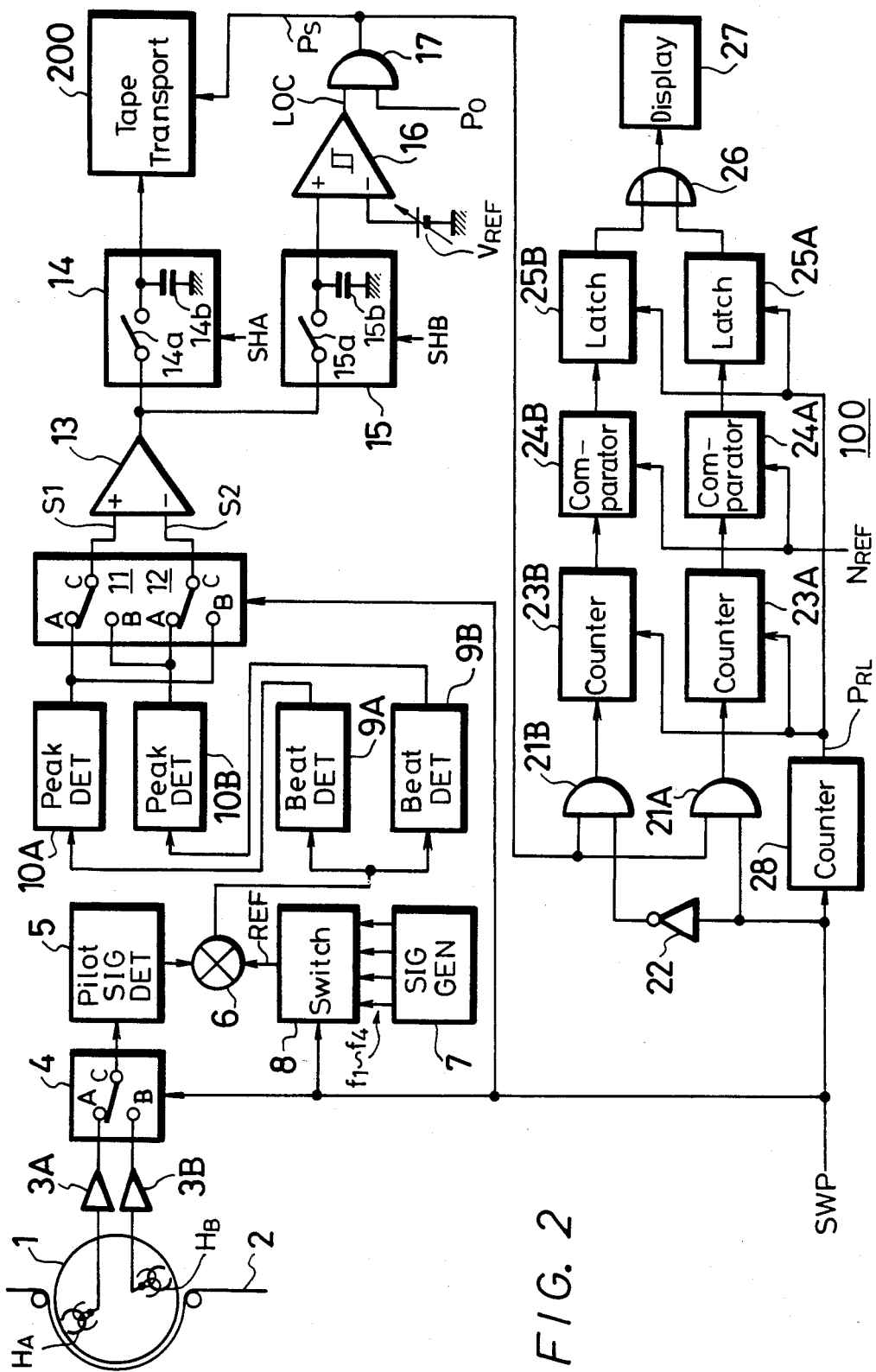
FIG. 2 is a block diagram showing a preferred embodiment of the present invention.

FIG. 2 shows a preferred embodiment of the present invention. This embodiment is applied, for example, to a VTR in which four tracking-servo pilot signals each having a frequency different from the frequencies of the other pilot signals are cyclically recorded on a plurality of oblique recording tracks, and a tracking servocontrol for reproduction is effected by the use of the pilot signals. The clogged state of the heads is detected upon a reverse reproduction of the magnetic tape in an edit recording mode.

Figure 1:
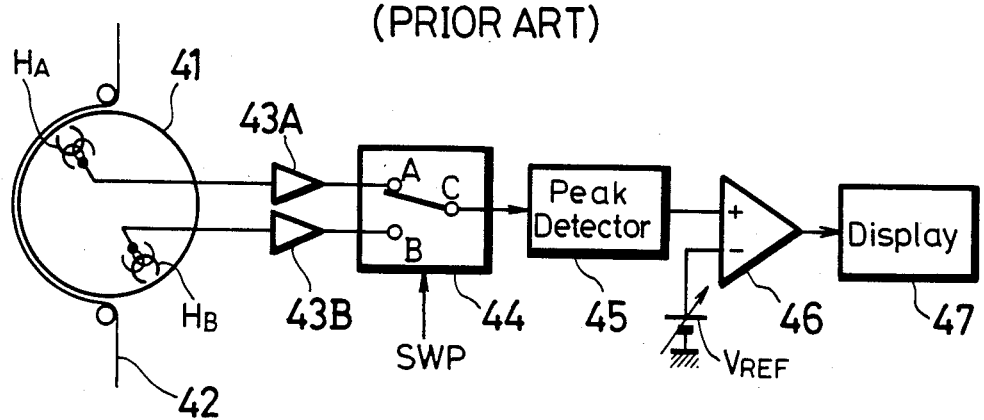
FIG. 1 is a block diagram showing a previously proposed clogged state detecting circuit.

In FIG. 2, a rotary drum 1 is provided to which a pair of magnetic heads $H_A$ and $H_B$ having respective azimuth angles different from each other are attached with an angular distance of 180°. A magnetic tape 2 is wrapped about the peripheral surface of the rotary drum 1 with a tape wrap angle of approximately 180° and transported in the longitudinal direction of the tape. The magnetic heads $H_A$ and $H_B$ are rotated once per frame period. The magnetic head $H_A$ scans the magnetic tape 2 in odd-numbered fields and the magnetic head $H_B$ scans the magnetic tape 2 in even-numbered fields. In this respect the apparatus of FIG. 2 is like that of FIG. 1.

Figure 3:
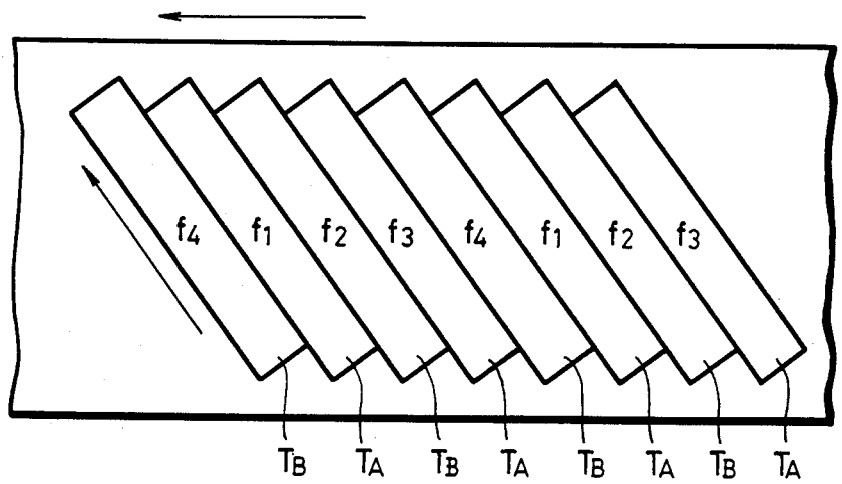
FIG. 3 is a diagram schematically showing a recording track pattern.

Oblique recording tracks $T_A$ and $T_B$ shown in FIG. 3 are successively formed on the magnetic tape 2 by the magnetic heads $H_A$ and $H_B$ during recording. Pilot signals of four different frequencies $f_1$, $f_2$, $f_3$ and $f_4$ are successively recorded on the magnetic tape 2 for tracking servocontrol. The frequencies of these pilot signals are cyclically changed, for example in the order $f_1$, $f_2$, $f_3$, $f_4$, $f_1$, ..., frequency-multiplexed with a video signal (a composite signal formed of a low band converted chrominance signal and an FM modulated luminance signal), and then recorded. The frequencies $f_1$ to $f_4$ of the pilot signals are selected to be in a lower band of the low band converted chrominance signal. For example, these frequencies may be respectively 102.544 kHz, 118.951 kHz, 165.210 kHz and 148.689 kHz. The frequencies are such that the differences in frequency between one of the pilot signals and the adjacent ones satisfy the following equations:

$$\Delta f_A = |f_1 - f_2| = |f_3 - f_4| \approx 16 \text{ kHz}$$

$$\Delta f_B = |f_2 - f_3| = |f_4 - f_1| \approx 47 \text{ kHz}$$

A tracking control device using pilot signals substantially as described above is disclosed for example in U.S. patent application Ser. No. 06/943,125, filed Dec. 18, 1986, which is incorporated herein by reference and the assignee of which is the same as that of the present invention.

Signals reproduced by the magnetic heads $H_A$ and $H_B$ during the reverse reproducing period in an edit recording mode are supplied through signal amplifiers 3A and 3B to terminals or contacts A and B, respectively, of a head changeover switch 4. The head changeover switch 4 is further supplied with a so-called RF switching pulse SWP which is synchronized with the rotary phase of the magnetic heads $H_A$ and $H_B$ and serves as a changeover control signal. A movable contact C of the head changeover switch 4 is connected to the terminal A in one field period during which the magnetic head $H_A$ scans the magnetic tape 2 and to the terminal B in one field period during which the magnetic head $H_B$ scans the magnetic tape 2.

Reproduced signals successively supplied as outputs from the head changeover switch 4 are supplied to a pilot signal detecting circuit 5 formed of a low pass filter. Pilot signals detected by the pilot signal detecting circuit 5 are then supplied to a multiplying circuit 6. A frequency signal generating circuit 7 locally generates signals having frequencies of $f_1$, $f_2$, $f_3$ and $f_4$ which are supplied to a switching circuit 8. The switching circuit 8 is also supplied with the RF switching pulse SWP (refer to FIG. 4A) as a switching control signal.

The switching circuit 8 for the most part supplies signals having nominally the same frequencies as those of the pilot signals recorded on the tracks $T_A$ and $T_B$ that are respectively scanned in each field period by the magnetic heads $H_A$ and $H_B$. However, in a period $T_O$ (FIG. 4B) equal to ⅛ to 1/6 times one field period, the switching circuit 8 generates output signals REF having the same frequencies as those of the pilot signals recorded on the tracks $T_A$ and $T_B$ which are to be scanned by the magnetic heads $H_A$ and $H_B$ in the next field. To be specific, if, for example, the pilot signal recorded on the track $T_A$ scanned by the magnetic head $H_A$ has the frequency $f_1$, the frequency of the signals supplied as outputs from the switching circuit 8 is successively changed from $f_1$ to $f_2$ and again to $f_1$. As another example, if the pilot signal recorded on the track $T_B$ scanned by the magnetic head $H_B$ has the frequency $f_2$, the frequency of the signals supplied as outputs from the switching circuit 8 is successively changed from $f_2$ to $f_3$ and again to $f_2$. The reference pilot signal, that is, the signal REF, is not limited to the position shown in FIG. 4B and may be located, for example, at the beginning of each field.

The output signals from the switching circuit 8 are supplied to the multiplying circuit 6 as reference pilot signals. In the multipling circuit 6, each of the pilot signals from the detecting circuit 5 is multiplied with a corresponding one of the reference pilot signals from the switching circuit 8. At the output side of the multiplying circuit 6, there are signals supplied as beat frequency outputs and indicative of the difference in frequency between each of the reproduced pilot signals and a corresponding one of the reference pilot signals.

In this operation, except during the period $T_O$, when the magnetic head $H_A$ scans the center of the track $T_A$, a difference or beat frequency signal of the frequency $\Delta f_A (=16 \text{ kHz})$ and a difference or beat frequency signal of the frequency $\Delta f_B (=47 \text{ kHz})$ are supplied as outputs at the same level. However, if the scanning position of the head $H_A$ is displaced towards the preceding recording track, the level of the beat frequency signal of the frequency $\Delta f_B$ becomes higher than the level of the beat frequency signal of the frequency $\Delta f_A$. By the same token, if the scanning position of the head $H_A$ is displaced towards the following recording track, the level of the beat frequency signal of the frequency $\Delta f_A$ becomes higher than the level of the beat frequency of the frequency $\Delta f_B$.

When the magnetic head $H_B$ scans the track $T_B$, the relationship of the levels of the beat frequency signals of the frequencies $\Delta f_A$ and $\Delta f_B$ is opposite to that of the case where the magnetic head $H_A$ scans the track $T_A$.

First a summary of the operation of the differential amplifier 13 of FIG. 2 will be given, then the operation will be described in greater detail, and then the generation of the input signals S1 and S2 to the differential amplifier 13 will be described.

Figure 6:
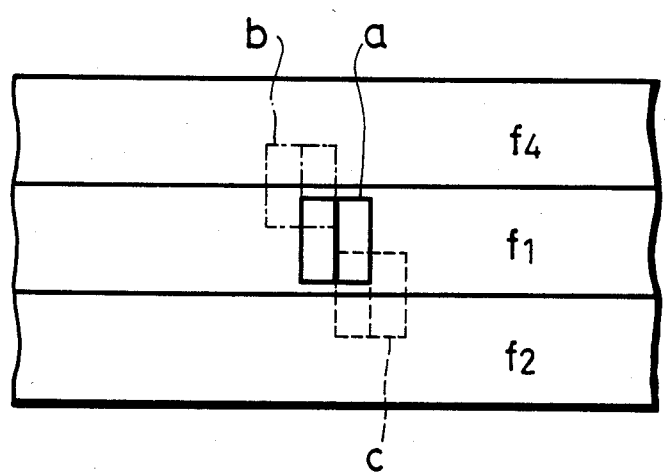
FIG. 6 is a schematic view showing the relationship of head displacement to the graph of FIG. 5A.

In summary, the curve shown in FIG. 5A is characteristic of the output level of the differential amplifier 13, except during the period $T_O$. The automatic track following (ATF) error level corresponds to the amount of head displacement, as shown by a comparison of FIGS. 5A and 6. When the head is in the correct tracking position a shown in FIG. 6, the beat components of 47 kHz and 16 kHz have equal levels, and the output of the differential amplifier 13 is zero. When the head is displaced to position b shown in FIG. 6, the beat component of 47 kHz is maximum and that of 16 kHz is zero. When the head is displaced to position c shown in FIG. 6, the beat component of 16 kHz is maximum and that of 47 kHz is zero. At intermediate displacements, the levels of the output of the differential amplifier 13 are also intermediate, as FIG. 5A shows. The output of the differential amplifier 13 is thus a measure of the direction and amount of the displacement of the head from a tracking position in which it is centered on a track on which a pilot signal of specified frequency is recorded.

The curve shown in FIG. 5B is also characteristic of the output level of the differential amplifier 13, although the timing of this curve differs from that of the curve in FIG. 5A. The curve in FIG. 5B is produced in accordance with the tracking error amount during the period $T_O$, while the curve in FIG. 5A is produced outside the period $T_O$.

The level of curve 5A is used for detecting the head displacement direction and also the head displacement amount after sampling the level by the sampling pulse SHA at every field interval.

Curve 5B is used for detecting whether the reproducing head is located at the correct lock position shown in FIG. 5 (for example, on a track $T_A$ on which the pilot signal of frequency $f_1$ is recorded) or at a quasi-lock position shown in FIG. 5 (for example, on a track $T_A$ on which the pilot signal of frequency $f_3$ is recorded. See also FIG. 3. At both the correct lock position and the quasi-lock position, the output of the differential amplifier 13 is the same (zero). However, the curve of FIG. 5B can distinguish between the two cases.

The operation of the differential amplifier 13 will now be described in greater detail. FIG. 5A illustrates the output level of the differential amplifier 13 outside the period $T_O$, when tracks on which the pilot signals with the frequencies $f_1$ and $f_3$ are recorded are reproduced. When a tracking displacement is zero on the abscissa, it means that the magnetic heads are in the correct tracking state, while when it is +4 to −4 on the abscissa, it shows respectively positive and negative displacements by one to four track widths or pitches.

FIG. 5B illustrates the output level of the differential amplifier 13 during the period $T_O$. When the magnetic head $H_A$ scans the recording track $T_A$ (only during the period $T_O$), if the scanning position is in the center of the track $T_A$, the level of the beat frequency signal of a frequency $\Delta f_A'$ (where $\Delta f_A'$ designates the beat frequency during the period $T_O$ so as to be distinguished from the beat frequency outside the period $T_O$) becomes higher. However, as the scanning position is displaced towards either the preceding or following track, the level of the beat frequency signal of the frequency $\Delta f_A'$ becomes lower.

When the magnetic head $H_B$ scans the recording track $T_B$ (only during the period $T_O$), if the scanning position is in the center of the track $T_B$, the level of the beat frequency signal of the frequency $\Delta f_B'$ becomes large or maximum. However, as the scanning position is displaced towards either the preceding or following track, the level of the beat frequency signal of the frequency $\Delta f_B'$ becomes larger (refer to FIG. 5B).

The beat component signals $\Delta f_A$ and $\Delta f_B$ of the reproduced pilot signals are used to detect the amount and direction of tracking displacement of the reproducing heads, while the beat component signals $\Delta f_A'$ and $\Delta f_B'$ are used to judge whether the head lock position is at a correct lock position or at a quasi-lock position which is displaced by two track widths or pitches from the correct track even though the reproducing head is apparently scanning a central portion of the tracks correctly. A level "H" in FIG. 5C shows a locked state. When the reproducing head is at the quasi-lock position, the curve of FIG. 5C is at a low level "L", and a servo operates to move the tape by two track widths or pitches to the correct lock position, as shown by solid arrows in FIG. 5A. This operation is disclosed by the aforementioned United States patent application Ser. No. 06/943,125.

Next the generation of the input signals S1 and S2 to the differential amplifier 13 will be described.

As FIG. 2. shows, the output signal from the multiplying circuit 6 is supplied to a beat detecting circuit 9A formed of a band pass filter for detecting the beat frequency $\Delta f_A$ (and also $\Delta f_A'$). An output signal from the detecting circuit 9A is supplied to the peak detecting circuit 10A, an output signal of which is supplied to a terminal A of a changeover switch 11 and a terminal B of a changeover switch 12. The output signal from the multiplying circuit 6 is supplied also to a beat detecting circuit 9B formed of a band pass filter for detecting the beat frequency $\Delta f_B$ (and also $\Delta f_B'$). An output signal from the detecting circuit 9B is supplied to the peak detecting circuit 10B, an output signal of which is supplied to a terminal B of the changeover switch 11 and a terminal A of the changeover switch 12. The changeover switches 11 and 12 are supplied with the RF switching pulse SWP as a changeover control signal. Movable contacts C of the changeover switches 11 and 12 are respectively changed over to be connected to their terminal A or B when the movable contact C of the head changeover switch 4 is changed over to be connected to the terminal A or B. Output signals S1 and S2 of the changeover switches 11 and 12 are both supplied to the differential amplifier or comparator 13 discussed above. The comparator 13 supplies an output signal of a level zero when S1=S2, a positive signal of a level corresponding to the difference between S1 and S2 when S1>S2, and a negative signal of a level corresponding to the difference between S1 and S2 when S1<S2.

When the magnetic head $H_A$ scans the recording track $T_A$ (except during the period $T_O$), the level of the beat frequency signal of the frequency $\Delta f_A$ coincides with the level of the beat frequency signal of the frequency $\Delta f_B$ if the magnetic head scans the center portion of the tracks, as mentioned above. The level of the beat frequency of the frequency $\Delta f_B$ becomes higher than the level of the beat frequency of the frequency $\Delta f_A$ as the magnetic head is displaced towards the preceding track. On the other hand, the level of the beat frequency of the frequency $\Delta f_A$ becomes higher than the level of the beat frequency of the frequency $\Delta f_B$ as the magnetic head is displaced towards the following track. Therefore, the level of the output signal from the peak detecting circuit 10A becomes the same as the level of the output signal from the peak detecting circuit 10B, when the scanning position by the head is at the center of the track. As the scanning position is displaced towards the following track, the level of the output signal from the peak detecting circuit 10A becomes higher. On the other hand, as the scanning position is displaced towards the preceding track, the level of the output signal from the peak detecting circuit 10B becomes higher.

When the magnetic head $H_B$ scans the recording track $T_B$, the relationship of the level between the beat frequency signals of the frequency $\Delta f_A$ and the frequency $\Delta f_B$ is opposite to that in the case where the magnetic head $H_A$ scans the recording track $T_A$. Consequently, the relationship of the level between the output signals of the peak detecting circuits 10A and 10B is also opposite to that in the case where the magnetic head $H_A$ scans the recording track $T_A$.

The movable contacts C of the changeover switches 11 and 12 are respectively changed over to be connected to their terminals A for one field period in which the magnetic head $H_A$ scans the recording track $T_A$ and to their terminals B for one field period in which the magnetic head $H_B$ scans the recording track $T_B$. Thus, when the magnetic heads $H_A$ and $H_B$ respectively scan the recording tracks $T_A$ and $T_B$ (except during the period $T_O$), the level of the signal S1 from the changeover switch 11 is the same as the level of the signal S2 from the changeover switch 12 if the scanning position is in the center of the recording tracks $T_A$ and $T_B$. The level of the output signal S1 becomes higher than that of the output signal S2 as the scanning position is displaced towards the following track. On the other hand, the level of the output signal S2 becomes higher than that of the output signal S1 as the scanning position is displaced towards the preceding track. It will therefore be understood that when the magnetic heads $H_A$ and $H_B$ respectively scan the recording tracks $T_A$ and $T_B$ (except during the period $T_O$), the comparator 13 produces an output signal of zero level if the scanning position is in the center of the tracks, a positive signal of a level proportional to the displacement if the scanning position is displaced towards the following track, and a negative signal of a level proportional to the displacement if the scanning position is displaced towards the preceding track.

When the magnetic head $H_A$ scans the recording track $T_A$ (only during the period $T_O$), the level of the beat frequency signal of the frequency $\Delta f_A'$ becomes high if the scanning position is in the center of the recording track, as described above. However, the level of the signal of the frequency $\Delta f_A'$ becomes lower as the scanning position is displaced towards the preceding or following track. In this case, the level of the beat frequency signal of the frequency $\Delta f_B'$ remains substantially zero for the period in which the magnetic head $H_A$ scans the recording track $T_A$ (only during the period $T_O$). Therefore, the level of the output signal from the peak detecting circuit 10A becomes large when the scanning position is in the center of the recording track, and lower as the scanning position is displaced towards the preceding or following track. In this case, the level of the output signal from the peak detecting circuit 10B becomes substantially zero.

When the magnetic head $H_B$ scans the recording track $T_B$ (only during the period $T_O$), the level of the beat frequency signal of the frequency $\Delta f_B'$ becomes large if the scanning position is in the center of the recording track, as described above. However, the level of the beat frequency signal of the frequency $\Delta f_B'$ becomes lower as the scanning position is displaced towards the preceding or following track. The level of the beat frequency signal of the frequency $\Delta f_A'$ remains substantially zero for the period in which the magnetic head $H_B$ scans the recording track $T_B$. Therefore, the level of the output signal from the peak detecting circuit 10B becomes large when the scanning position is in the center of the recording track, while it becomes lower as the scanning position is displaced towards the preceding or following track. The level of the output signal from the peak detecting circuit 10A becomes substantially zero.

However, the movable contacts of the changeover switches 11 and 12 are respectively changed over to be connected to their terminals A for one field period in which the magnetic head $H_A$ scans the recording track $T_A$ and to their terminals B for one period in which the magnetic head $H_B$ scans the recording track $T_B$. Thus, when the magnetic heads $H_A$ and $H_B$ respectively scan the recording tracks $T_A$ and $T_B$ (only during the period $T_O$), the level of the output signal S1 from the changeover switch 11 is large if the scanning position is in the center of the recording tracks $T_A$ and $T_B$. The level of the output signal S1 becomes lower as the scanning position is displaced towards the preceding or following track. The level of the output signal S2 from the changeover switch 12 becomes substantially zero. It will therefore be understood that when the magnetic heads $H_A$ and $H_B$ respectively scan the recording tracks $T_A$ and $T_B$ (only during the period $T_O$), the comparator 13 supplies an output signal of a large level if the scanning position is in the center of the tracks, and a lower level signal as the scanning position is displaced towards the preceding or following track.

The output signal from the comparator 13 is supplied to a sample-and-hold circuit 14 comprising a connecting switch 14a and a charging capacitor 14b. The sample-and-hold circuit 14 is also supplied with a control signal SHA (shown in FIG. 4C) which assumes the low level "0" during the period $T_O$ and the high level "1" at other times. The connecting switch 14a is turned on (closed) when the signal SHA is at the high level "1" and turned off (opened) when the signal SHA is at the low level "0". Therefore, the sample-and-hold circuit 14 supplies the output signal from the comparator 13 when the magnetic heads $H_A$ and $H_B$ respectively scan the recording tracks $T_A$ and $T_B$ (except during the period $T_O$); that is, the sample-and-hold circuit 14 supplies a signal of zero level when the scanning position is in the center of the track, a positive signal of a level proportional to the degree of the displacement when the scanning position is displaced towards the following track, and a negative signal of a level proportional to the degree of the displacement when the scanning position is displaced towards the preceding track. The output signal from the sample-and-hold circuit 14 is supplied, as a phase-error signal, to tape transportation apparatus 200 comprising a capstan servocircuit, a capstan motor, a driving circuit for the capstan motor, and so on. By the operations described above, the magnetic heads $H_A$ and $H_B$ are controlled to scan correctly the respective centers of the recording tracks $T_A$ and $T_B$. In other words, a so-called tracking servo is carried out.

The output signal from the comparator 13 is supplied also to the sample-and-hold circuit 15 comprising a connecting switch 15a and a charging circuit 15b. The sample-and-hold circuit 15 is also supplied with a control signal SHB (shown in FIG. 4D) which assumes the high level "1" during the period $T_O$ and the low level "0" at other times. The connecting switch 15a is turned on (closed) when the signal SHB is at the high level "1" and turned off (opened) when the signal SHB is at the low level "0". Therefore, the sample-and-hold circuit 15 supplies the output signal from the comparator 13 when the magnetic heads $H_A$ and $H_B$ respectively scan the recording tracks $T_A$ and $T_B$ (only during the period $T_O$): that is, the sample-and-hold circuit 15 supplies a signal of high level when the scanning position is in the center of the track and a signal of a lower level as the scanning position is displaced towards the preceding or following track.

The output signal from the sample-and-hold circuit 15 is supplied to a comparator 16 effecting a hysteresis operation to be compared with a reference voltage $V_{REF}$. The comparator 16 supplies a signal of the high level "1" when the output signal from the sample-and-hold circuit 15 has a higher level than the reference voltage $V_{REF}$ and a signal of the low level "0" when the output from the sample-and-hold circuit 15 has a lower level than the reference voltage $V_{REF}$. Specifically, the comparator 16 supplies an output signal LOC of the high level "1" when the magnetic heads $H_A$ and $H_B$ respectively scan substantially the center of the recording tracks $T_A$ and $T_B$ and of the low level "0" in the other cases as shown in FIG. 4E.

The output signal from the comparator 16 is supplied to an AND circuit 17. The AND circuit 17 is also supplied with a servolock detecting pulse $P_O$ (shown in FIG. 4F) corresponding to the period $T_O$. The AND circuit 17 supplies a servolock output pulse Ps (shown in FIG. 4G) which indicates that the magnetic heads $H_A$ and $H_B$ are scanning substantially the center of the recording tracks $T_A$ and $T_B$ (the correct tracking state) when the comparator 16 supplies the signal LOC of the high level "1". the pulse Ps indicative of the servolock is supplied to a servocircuit arranged in the aforementioned tape transportation apparatus 200. When the servo is released from the locked state, the output LOC from the comparator 16 assumes the low level "0" as shown in FIG. 4E. Consequently, the servolock pulse Ps supplied by the AND circuit 17 is as shown in FIG. 4G, wherefrom the pulse Ps' represented by a broken line is removed. The output signal Ps from the AND circuit 17 is supplied to a system controller (not shown) comprising, for example, a microcomputer. For example, if this servolock pulse Ps is derived after a reverse reproduction of the video signal in the edit recording mode has been carried out for a predetermined time period, the VTR has its operating mode changed over from a reproducing mode to a recording mode to start recording a video signal again. If clogging of the magnetic heads occurs in this mode, the pilot signals $f_1$ and $f_4$ are not recorded on the tape, so that the output LOC from the comparator 16 continues to assume the low level "0" as if the servo were released from the locked state.

FIG. 2 illustrates apparatus for detection of the clogged state. As that figure shows, the output signal from the AND circuit 17 is supplied to a clogged state detecting section 100. More specifically, the output signal from the AND circuit 17 is supplied to the inputs of AND circuits 21A and 21B arranged in the clogging detecting section 100. The AND circuit 21A is supplied at its other input with the RF switching pulse SWP, and the AND circuit 21B is supplied at its other input with the RF switching pulse SWP after its inversion by an inverter 22. When the servolock pulse Ps is obtained from the AND circuit 17 during one field period (the RF switching pulse SWP is at the high level "1") in which the magnetic head $H_A$ scans the magnetic tape 2, the servolock pulse Ps is supplied to a counter 23A through the AND circuit 21A as a clock signal (FIG. 4H). On the other hand, when the servolock pulse Ps is obtained from the AND circuit 17 during one field period (the RF switching pulse SWP is at the low level "0") in which the magnetic head $H_B$ scans the magnetic tape 2, the servolock pulse Ps is supplied to a counter 23B through the AND circuit 21B as a clock signal (FIG. 4I).

Counted output signals from the counters 23A and 23B are supplied to comparators 24A and 24B, respectively. These comparators 24A and 24B are respectively set at a reference value $N_{REF}$. When the counted values supplied as outputs from the counters 23A and 23B are larger than the reference value $N_{REF}$, the comparators 24A and 24B respectively supply signals of the low level "0". On the other hand, when the counted values supplied by the counters 23A and 23B are smaller than the reference value $N_{REF}$, the comparators 24A and 24B respectively supply output signals of the high level "1". The output signal from the comparators 24A and 24B are supplied to an OR circuit 26 through latch circuits 25A and 25B, respectively. The output from the OR circuit 26 is then supplied to a display device 27 which is constructed so that it blinks when the output signal from the OR circuit 26 is at the high level "1".

The RF switching pulse SWP is supplied to a counter 28. The counter 28 outputs a pulse $P_{RL}$ which rises after a reverse reproduction for the edit recording mode has been carried out for a predetermined time period and falls after a predetermined time period, for example, after a ten-frame period has elapsed as shown in FIG. 4J. The pulse $P_{RL}$ from the counter 28 is supplied to the counters 23A and 23B to reset the counters 23A and 23B at the rising edge of the pulse $P_{RL}$. The pulse $P_{RL}$ is further supplied to the latch circuits 25A and 25B so that the latch circuits 25A and 25B respond to signals supplied by the comparators 24A and 24B at the falling edge of the pulse $P_{RL}$.

When the width of the pulse $P_{RL}$ is determined to be, for example, a 10-frame period as mentioned above, the reference value $N_{REF}$ set in the comparators 24A and 24B is, for example, "8".

In the apparatus described above, when the magnetic heads $H_A$ and $H_B$ operate in a normal state, not in the clogged state, the pilot signals of respective predetermined frequencies are recorded in the tracks $T_A$ and $T_B$ on a portion of the tape 2 to be rewound, so that the reproducing tracking servo operates to keep the magnetic heads $H_A$ and $H_B$ in the correct tracking state wherein the magnetic heads $H_A$ and $H_B$ scan substantially the center of the recording tracks $T_A$ and $T_B$ during the reverse reproduction in the edit recording mode for the predetermined time period. Therefore, the servolock pulse Ps can be derived from the AND circuit 17 in every field period in which the magnetic heads $H_A$ and $H_B$ scan the tape 2. At the falling edge of the pulse $P_{RL}$ from the counter 28, the count values of the counters 23A and 23B exceed the reference value $N_{REF}$, so that the output signals of the comparators 24A and 24B assume the low level "0" and then are taken in by the latch circuits 25A and 25B, respectively. Consequently, the output signal from the OR circuit 26 assumes the low level "0" so that the display device 27 does not blink. In other words, the display device 27 does not indicate that clogging has occured.

When the magnetic head $H_A$ or $H_B$ is in the clogged state, the pilot signal is not recorded on the recording tracks $T_A$ or $T_B$ of the tape 2 in its part to be rewound, or the pilot signal is recorded at a level too low to be detected. Since the pilot signal is not recorded on the recording track $T_A$ or $T_B$ of the tape 2 or the pilot signal is recorded at a level too low to be detected, the tracking servo does not operate even after the reverse reproduction for the edit recording mode has been carried out for the predetermined time period. Thus, the correct tracking state cannot be ensured.

When, for example, the magnetic head $H_A$ is in the clogged state, the servolock pulse Ps cannot be derived from the AND circuit 17 in one field period in which the magnetic head $H_A$ scans the magnetic tape 2. Therefore, at the falling edge of the pulse $P_{RL}$ from the counter 28, the count value of the counter 23A does not exceed the reference value $N_{REF}$, and the output signal from the comparator 24A assumes the high level "1", which is taken in by the latch circuit 25A. Consequently, the output signal from the OR circuit 26 assumes the high level "1".

When the magnetic head $H_B$ is in the clogged state, the servolock pulse Ps cannot be derived from the AND circuit 17 during the field period in which the magnetic head $H_B$ scans the magnetic tape 2. Therefore, at the falling edge of the pulse $P_{RL}$ from the counter 28 the counted value of the counter 23B does not exceed the reference value $N_{REF}$, and the output signal from the comparator 24B assumes the high level "1", which is taken in by the latch circuit 25B. Consequently, the output signal from the OR circuit 26 assumes the high level "1".

As described above, when the magnetic head $H_A$ or $H_B$ is in the clogged state, the output signal from the OR circuit 26 assumes the high level "1", and the display device 27 blinks to indicate that clogging has occured.

In accordance with the present invention, the clogged state is detected on the basis of whether or not a predetermined number of the servolock pulses Ps is generated in a predetermined constant time period. It is therefore possible to detect the clogged state with certainty despite noise and so on, in contrast to the situation that results when conventional head clogging detection apparatus is employed. If a circuit for generating the servolock pulse Ps is provided, the apparatus of the present invention can be manufactured inexpensively merely by adding the clogged state detecting section 100.

The preceding explanation relates especially to the case where the clogged state is detected in the edit recording mode. However, it is clear that, in accordance with the invention, the clogged state can be detected also in the normal reproducing mode.

Also, although in the embodiment described above the clogged state detecting section 100 employs the counters 23A and 23B and the digital comparators 24A and 24B, the same effect can be obtained by analog operations effected by substituting integrating circuits, voltage comparators, etc.

Further, in the embodiment described above, the clogged state detecting section 100 is constructed by hardware. However, the same operation can be effected in a software fashion by the use of a microcomputer or the like.

Moreover, the present invention is adapted to VTR recording and reproducing apparatus or to apparatus exclusively for recording a video signal.

According to the present invention as described above, the locked state of the tracking servo is detected by the use of pilot signals, and the clogged state is detected on the basis of an output indicative of the detection result, so that the clogged state can be reliably detected despite the influence of noise and so on, in contrast to the situation that results when conventional head clogging detector apparatus is employed.

The preceding description is relates to a single preferred embodiment of the invention, but it will be apparent that many modifications and variations can be effected by one skilled in the art without departing from the spirit or scope of the invention and that the scope of the invention is determined by the appended claims only.

I claim as my invention:

1. Apparatus wherein pilot signals of different frequencies are recorded cyclically and in a predetermined sequence on parallel record tracks on a moving record medium together with an information signal organized in a series of fields and are employed to control tracking of a reproducing head of said apparatus during reproduction of said pilot signals and information signal; said apparatus comprising:

means for transporting said record medium at a predetermined speed and phase relative to the reproducing head in order to generate reproduced pilot signals and a reproduced information signal;

means for generating a reference signal;

means for generating reference pilot signals;

means for supplying a head switching signal; and means for effecting a multiplication of said reproduced pilot signals with said reference pilot signals switched in accordance with said head switching signal and for generating a tracking error signal in response to said multiplication;

sampling-and-hold means for sampling and holding said tracking error signal at predetermined points of a plurality of said fields;

comparator means for effecting a comparison of the output of said sample-and-hold means with said reference signal and producing a comparator output signal having a state that depends on said comparison; and head clogging detector means responsive to said comparator output signal for effecting detection of a head-gap clogged condition of said reproducing head.

2. Apparatus according to claim 1, comprising means for achieving a locked state of said tracking with respect to said pilot signals when in proper phase relation thereto and wherein said head-gap clogged condition of said reproducing head depends upon whether or not said tracking is in said locked state.

3. Apparatus according to claim 2, comprising means for establishing a recording mode of said apparatus and wherein said reproducing head records said information signal and said pilot signals on said record medium when said apparatus is in said recording mode.

4. Apparatus according to claim 1, wherein said head clogging detector means comprises means for supplying sequential output pulses at predetermined intervals in response to the state of said comparator output signal.

5. Apparatus according to claim 4, wherein said head clogging detector means comprises counter means for counting said sequential output pulses for a predetermined time period and effecting said detection on the basis of the number of said sequential output pulses counted during said predetermined time period.

6. Apparatus according to claim 5, wherein said head clogging detector means comprises a display responsive to the counting of said counter means for indicating whether or not said head-gap clogged condition of said reproducing head has occured.

* * * * *